(12) United States Patent
Patel et al.

(10) Patent No.: US 7,447,186 B2
(45) Date of Patent: Nov. 4, 2008

(54) METHODS AND APPARATUS FOR IMPLEMENTING MOBILE IPV6 ROUTE OPTIMIZATION ENHANCEMENTS

(75) Inventors: Alpesh Patel, Pleasanton, CA (US); Kent K. Leung, Los Altos, CA (US); Gopal Dommety, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 361 days.

(21) Appl. No.: 11/129,265

(22) Filed: May 12, 2005

(65) Prior Publication Data

US 2006/0256762 A1    Nov. 16, 2006

(51) Int. Cl.
*H04Q 7/00*    (2006.01)
*H04L 12/28*    (2006.01)
*H04L 12/56*    (2006.01)

(52) U.S. Cl. .................... 370/338; 370/328; 370/389; 370/392; 370/393; 370/400; 370/409

(58) Field of Classification Search ..............
370/395.31–395.32, 395.52–395.53, 901–904, 370/238, 908, 912–913, 338–339, 351–356, 370/310, 328, 335, 349, 392–393, 397, 399, 370/400–401, 285, 373, 381–384, 389, 409–410, 370/911, 313; 709/238–243, 228; 713/151–153, 713/160–163, 261, 167, 169, 164; 455/428, 455/445, 550.1, 556.2, 561, 41.2–41.3, 403, 455/466, 557–558, 414.4, 417–420, 432.1–432.3, 455/435.1–435.3, 446–451, 456.1–456.6, 455/517, 524–525
See application file for complete search history.

(56) References Cited

U.S. PATENT DOCUMENTS

| 6,636,498 | B1 | 10/2003 | Leung |
| 2004/0057384 | A1* | 3/2004 | Le et al. ............... 370/252 |
| 2004/0095913 | A1* | 5/2004 | Westphal ............... 370/338 |
| 2004/0156374 | A1* | 8/2004 | Lee et al. ............... 370/401 |
| 2004/0236937 | A1* | 11/2004 | Perkins et al. ......... 713/150 |

(Continued)

OTHER PUBLICATIONS

Transport Mode, Microsoft TechNet (pp. 13 and 15); updated Jan. 21, 2005.*

(Continued)

*Primary Examiner*—Meless N Zewdu
(74) *Attorney, Agent, or Firm*—Weaver Austin Villeneuve & Sampson LLP

(57) ABSTRACT

Methods and apparatus for establishing an optimized route between a Mobile Node and a Correspondent Node are disclosed. In particular, a Correspondent Node is notified of the location of a Mobile Node, thereby enabling the Correspondent Node to communicate directly with the Mobile Node. This is accomplished by sending a HOTi message protected in IPSec transport mode from the Mobile Node to a Home Agent associated with the Mobile Node for modification and transmission of a modified HOTi message to the Correspondent Node. The Mobile Node then receives a HOT message protected in IPSec transport mode from the Home Agent associated with the Mobile Node, the HOT message being received from the Home Agent associated with the Mobile Node after modification has been performed by the Home Agent on an initial HOT message received by the Home Agent from the Correspondent Node.

19 Claims, 5 Drawing Sheets

U.S. PATENT DOCUMENTS

2005/0175002 A1* 8/2005 Le et al. .................. 370/389
2005/0185612 A1* 8/2005 He .......................... 370/329

OTHER PUBLICATIONS

D. Johnson, et al, "*Mobility Support in IPv6*," RFC 3775, Jun. 2004, 129 pages.

J. Arkko, et al., "*Using IPsec to Protect Mobile IPv6 Signaling Between Mobile Nodes and Home Agents*," RFC 2002, Jun. 2004, 32 pages.

C. Perkins, "IP Mobility Support," RFC 2002, Oct. 1996, 73 pages.

A. Patel, et al, "*Methods and Apparatus For Achieving Route Optimization Between Mobile Networks And A Correspondent Node Using A Mobile Router As a Proxy Node*," U.S. Appl. No. 10/874,650, filed Jun. 22, 2004.

A. Patel, et al, "*Methods And Apparatus For Achieving Route Optimization And Location Privacy In An IPv6 Network*," U.S. Appl. No. 10/898,579, filed Jul. 23, 2004.

* cited by examiner

METHODS AND APPARATUS FOR IMPLEMENTING MOBILE IPV6 ROUTE OPTIMIZATION ENHANCEMENTS

BACKGROUND OF THE INVENTION

The present invention relates to Mobile IP network technology. More specifically, this invention relates to mechanisms for achieving route optimization between a Mobile Node supporting Mobile IP and a Correspondent Node.

Mobile IP is a protocol which allows laptop computers or other mobile computer units (referred to as "Mobile Nodes" herein) to roam between various sub-networks at various locations—while maintaining internet and/or WAN connectivity. Without Mobile IP or a related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

The Mobile IP process in a Mobile Ipv4 environment are illustrated in FIG. 1. As shown there, a Mobile IP environment 2 includes the internet (or a WAN) 4 over which a Mobile Node 6 can communicate remotely via mediation by a Home Agent 8 and may also include a Foreign Agent 10. In the absence of a Foreign Agent, the Mobile Node 6 can obtain a topologically correct IP address (i.e., collocated IP address) and register this IP address with the Home Agent. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a Correspondent Node 18 from its new location. In Mobile IPv4, a message from the Mobile Node is then packetized and forwarded through Foreign Agent 10 over the internet 4 and to Correspondent Node 18 (as indicated by the dotted line "packet from MN") according to a standard internet protocol. If Correspondent Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Correspondent Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling." In the absence of a Foreign Agent, packets are tunneled directly to the Mobile Node 6 collocated care-of address.

The Mobile IP protocol for Ipv6 has been described in RFC 3775, entitled "Mobility Support in Ipv6," published in June 2004, by Johnson et al. RFC 3775 discloses a protocol which allows nodes to remain reachable while roaming in IPv6. RFC 3775 is incorporated herein by reference for all purposes. As disclosed in "Mobility Support in IPv6," the Home Agent generally advertises its address, which is obtained by a Mobile Node. In Mobile Ipv6, there is no Foreign Agent. However, an access router 10 is present to provide connectivity to the network. The Mobile Node then sends a Binding Update message to the Home Agent. The Home Agent then sends a Binding Acknowledgement message to the Mobile Node. The Binding Update and Binding Acknowledgement messages are protected in IPSec transport mode. The Home Agent creates a binding cache entry and a tunnel is established between the Mobile Node's care-of address and the Home Agent. When a Correspondent Node sends a packet to the Mobile Node, it is forwarded to the Mobile Node by the Home Agent via the tunnel that has been established.

Since the Correspondent Node is generally unaware of movement of the Mobile Node, packets continue to be forwarded from the Correspondent Node to the Mobile Node's care-of address via the Home Agent. As a result, packets are routed inefficiently. In order to optimize the route via which packets are routed from the Correspondent to the Mobile Node, it is desirable to enable the Correspondent Node to communicate directly with the Mobile Node. This is generally accomplished using a method termed "Route Optimization" as set forth in RFC 3775, which is incorporated herein by reference for all purposes.

The route optimization process set forth in RFC 3775 is a fairly elaborate process. First, through two sets of messages (Home Test (HOT), Home Test Init (HOTi), Care of Test (COT), and Care of Test Init (COTi)) generally referred to as "return routability signaling," described in further detail below, the Mobile Node and the Correspondent Node generate a shared secret key. Second, the Mobile Node sends a Binding Update message to the Correspondent Node to enable the Correspondent Node to send packets directly to the Mobile Node at its care-of address, and the Correspondent Node sends a Binding Acknowledgement message to the Mobile Node at its care-of address.

Return routability signaling is based upon two key assumptions. The first assumption is that the routing infrastructure is secure. In other words, there needs to be an assumption that the return routability signaling messages are coming from the Mobile Node, rather than an impostor. The second assumption is that IPSec in tunnel mode is used to protect the HoT and HoTi messages that are typically transmitted between the Home Agent and the Mobile Node. The use of IPSec Encapsulating Security Payload (ESP) to secure Mobile IPv6 signaling between the Home Agent and the Mobile Node is disclosed in RFC 3776, which is incorporated herein by reference for all purposes. Specifically, a security association is used to secure transmissions in each direction. In other words, the security association is used to authenticate and protect the HoTi and HoT messages.

As indicated above, return routability signaling in accordance with RFC 3775 comprises two sets of messages. The first set of messages includes a HOT and HOTi message, while the second set of messages includes a COT and COTi message. Specifically, the Mobile Node sends a HOTi message including a source address equal to the Mobile Node's Home Address to the Home Agent. The Home Agent then forwards the HOTi message to the Correspondent Node. The Correspondent Node replies with a HOT message to the Home Agent, which is forwarded to the Mobile Node. In addition, the Mobile Node sends a COTi message including a source address equal to the Mobile Node's care-of address to the Correspondent Node. The Correspondent Node then transmits a COT message to the Mobile Node.

Through the return routability signaling messages, the Mobile Node and Correspondent Node derive tokens from which a shared secret key is derived. This shared secret key is then used by both the Mobile Node and the Correspondent Node to authenticate the Binding Update and Binding Acknowledgement between the Mobile Node and the Correspondent Node.

The route optimization process set forth above is dependent upon the assumption that the return routability messages cannot be intercepted, and therefore that the source address is correct. Similarly, the underlying assumption that the tunnel via which the HoTi and HoT messages are transmitted is protected.

IPSec is a framework for security that is used to protect the Binding Update and Acknowledgement messages. Specifically, IPSec is a set of protocols developed by the IETF to support secure exchange of packets at the IP layer. IPSec supports two encryption modes: transport and tunnel. Transport mode encrypts only the data portion (payload) of each packet, but leaves the header untouched. The more secure tunnel mode encrypts both the header and the payload. On the receiving side, an IPSec-compliant device decrypts each packet.

IPSec in transport mode allows for lower processing overhead, but provides neither authentication nor encryption for the IP header, making it vulnerable to spoofing. IPSec in tunnel mode provides greater protection, but has a higher overhead. Moreover, IPSec in tunnel mode also provides the advantage of hiding the original source and destination addresses from users on the public network, defeating or at least reducing the power of traffic analysis attacks.

The Mobile IPv6 base specification, RFC 3775, requires that IPSec in tunnel mode be used to protect the return routability messages (e.g., HOT, HOTi) transmitted between the Mobile Node and Correspondent Node through the Home Agent. Since an IPSec tunnel is established between the Mobile Node's care-of address and the Home Agent, when the Mobile Node moves, it must establish a new tunnel between the Mobile Node and the Home Agent. Specifically, this requires re-registration on behalf of the Mobile Node via the return routability signaling messages. As a result, it is an expensive process to generate a new tunnel (and associated security association) between the Mobile Node's new location and the Home Agent.

In view of the above, it would be beneficial if route optimization could be enhanced between a Mobile Node and a Correspondent Node.

SUMMARY OF THE INVENTION

Methods and apparatus for establishing an optimized route between a Mobile Node and a Correspondent Node are disclosed. This is accomplished, in part, by securing the HOTi and HOT messages transmitted between the Mobile Node and Home Agent in IPSec transport mode, rather than IPSec tunnel mode. In this manner, a tunnel endpoint need not be updated when the Mobile Node roams to a new location.

In accordance with one aspect of the invention, the Mobile Node sends a HOTi message protected in IPSec transport mode from the Mobile Node to a Home Agent associated with the Mobile Node for modification and transmission of a modified HOTi message to the Correspondent Node. The Mobile Node then receives a HOT message protected in IPSec transport mode from the Home Agent associated with the Mobile Node, the HOT message being received from the Home Agent associated with the Mobile Node after modification has been performed by the Home Agent on an initial HOT message received by the Home Agent from the Correspondent Node.

In accordance with another aspect of the invention, methods and apparatus for notifying a Correspondent Node of a Mobile Node's location is performed by a Home Agent supporting Mobile IP, thereby enabling the Correspondent Node to communicate directly with the Mobile Node. When the Home Agent receives a HOTi message protected in IpSec transport mode from the Mobile Node, it modifies the HOTi message and transmits the modified HOTi message to the Correspondent Node. The Home Agent then receives a HOT message from the Correspondent Node, it modifies the HOT message and transmits the modified HOT message to the Mobile Node, where the modified HOT message is protected in IPSec transport mode.

In accordance with a first embodiment, the HOTi message transmitted from the Mobile Node to the Home Agent includes a source address equal to the care-of address of the Mobile Node, a destination address equal to the Home Agent address, a destination option equal to the Mobile Node's home address, and an extra option including the Correspondent Node's address. When the Home Agent receives the HOTi message, it removes the options from the HOTi message, replaces the source address with the home address of the Mobile Node obtained from the destination option, and replaces the destination address with the Correspondent Node's address obtained from the extra option.

In accordance with the first embodiment, when the HOT message is received by the Home Agent from the Correspondent Node, it includes a source address including the Correspondent Node's address and a destination address equal to the Mobile Node's home address. The Home Agent replaces the source address with its address, provides the source address of the Correspondent Node in an option of the modified HOT message and the home address of the Mobile Node in an extra option of the modified HOT message. The Home Agent then transmits the modified HOT message to the Mobile Node's care-of address. In the first embodiment, the format of the HOTi/HOT messages differ from the format of the modified HOTi/HOT messages. Thus, changes to the Correspondent Node need not be performed in order to implement this embodiment.

In accordance with a second embodiment, the Home Agent is in the switching path, and therefore need not parse the traffic transmitted between the Mobile Node and the Correspondent Node via the Home Agent. In other words, the packets are transmitted directly to the Home Agent for processing. Specifically, the Mobile Node sends a HOTi message including a source address equal to the care-of address of the Mobile Node, a destination address including the address of the Home Agent, a destination option including the Mobile Node's home address, and an extra option including the Correspondent Node's address. The Home Agent generates a modified HOTi message in which the source address is the Home Agent address, the destination address is the address of the Correspondent Node, the destination option includes the Mobile Node's home address, and the extra option is the care-of address of the Mobile Node.

In accordance with the second embodiment, the Correspondent Node generates a token for use in authenticating communications between the Correspondent Node and a Mobile Node using the Mobile Node's home address. It is important to note that RFC 3775 requires that the source IP address of the HOTi message be used to generate this token. However, in accordance with the second embodiment, the Mobile Node's home address is not the source address of the HOTi message received by the Correspondent Node.

In accordance with the second embodiment, the Correspondent Node sends a HOT message including a source address equal to the Correspondent Node's address, a destination address equal to the address of the Home Agent, a destination option including the Mobile Node's home address, and an extra option including the care-of address of the Mobile Node. The Home Agent examines the packet and generates a modified HOT message including a source address including the Home Agent address, a destination address including the Mobile Node's home address, an option including the care-of address of the Mobile Node, and an extra option including the Correspondent Node's address.

In accordance with a third embodiment, the routing header is used by the Home Agent to intercept HOT/HOTi packets. Specifically, the Home Agent generates a modified HOTi message including a source address equal to the Mobile Node's home address, a destination address equal to the Correspondent Node's address, and a Routing Header Routing Header, type 2 (RH2) option identifying an address of the Home Agent. The Home Agent receives a HOT message from the Correspondent Node including a source address equal to the Correspondent Node's address, a destiniation address equal to the Mobile Node's home address, and a RH2 option including the address of the Home Agent. The Home Agent optionally removes the option and forwards the HOT message using IPSec transport mode by setting the source address of the HOT message to the address of the Home Agent and provides the address of the Correspondent Node in an option of the HOT message. The HOTi message sent from the Mobile Node to the Home Agent and the modified HOT message sent from the Home Agent to the Mobile Node may be composed in accordance with the format of the first or second embodiments.

In accordance with the second and third embodiments, the address of the Home Agent may be an address of the Home Agent that is assigned or dedicated to HOT/HOTi processing. The address of the Home Agent identified in the option of the modified HOTi and HOT messages may be a virtual IP address. In this manner, the identity of the Home Agent may be secured.

In accordance with another aspect of the invention, the invention pertains to a system operable to perform and/or initiate route optimization between a Mobile Node and a Correspondent Node. The system includes one or more processors and one or more memories. At least one of the memories and processors are adapted to provide at least some of the above described method operations. In yet a further embodiment, the invention pertains to a computer program product for performing the disclosed methods. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures, which illustrate by way of example the principles of the invention.

DETAILED DESCRIPTION OF SPECIFIC EMBODIMENTS

Figure 1:
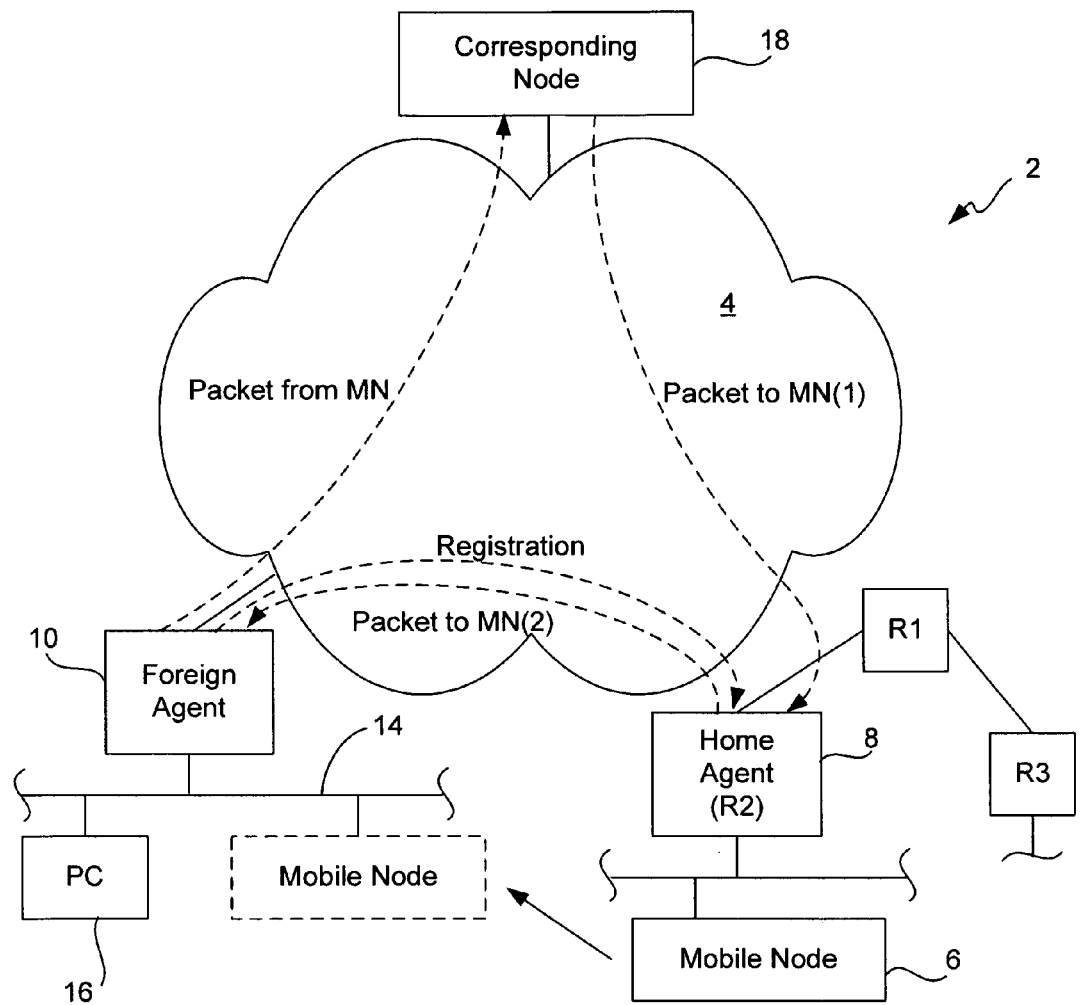
FIG. 1 is a diagram of a Mobile IP network segment and associated environment.

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Embodiments of the invention enable route optimization between a Mobile Node supporting Mobile IP and a Correspondent Node to be achieved. This is accomplished, in part, through transmitting HOTi/HOT messages between the Mobile Node and the Home Agent via the IPSec protocol in transport mode, rather than the tunnel mode. Accordingly, it is unnecessary to update an IPSec tunnel endpoint and associated security association between the Home Agent and the Mobile Node as the Mobile Node roams.

The embodiments disclosed herein are described with reference to Mobile IPv6. However, it is important to note that the disclosed embodiments may apply to other subsequent versions of Mobile IP in which HOTi/HOT messages are transmitted.

As will be described in further detail below, a Mobile Node supporting Mobile IP may notify a Correspondent Node of its location by sending a HOTi message protected in IPSec transport mode to a Home Agent associated with the Mobile Node for modification and transmission of a modified HOTi message to the Correspondent Node. The Mobile Node receives a HOT message protected in IPSec transport mode from the Home Agent associated with the Mobile Node, the HOT message being received from the Home Agent associated with the Mobile Node after modification has been performed by the Home Agent on an initial HOT message received by the Home Agent from the Correspondent Node. A binding may then be generated between the Mobile Node and the Correspondent Node. In this manner, the Correspondent Node may communicate directly with the Mobile Node without sending packets to the Mobile Node via the Home Agent.

In the disclosed embodiments, the Home Agent receives a HOTi message protected in IPSec transport mode from the Mobile Node. The Home Agent modifies the HOTi message and transmits the modified HOTi message to the Correspondent Node. When the Home Agent receives a HOT message from the Correspondent Node, it modifies the HOT message and transmits the modified HOT message to the Mobile Node, where the modified HOT message is protected in IPSec transport mode. While the modified HOTi message and the initial HOT message may be protected in IPSec transport mode, they need not be protected in IPSec transport mode. Thus, the modified HOTi message and initial HOT message (transmitted between the Home Agent and Correspondent Node) may be transmitted in accordance with RFC 3775.

There are a number of ways in which route optimization can be achieved. In the following description, three separate exemplary embodiments will be described with reference to FIGS. 2 through 4. However, it is important to note that these examples are merely illustrative. Therefore, other packet formats and combinations of the described method steps may also be implemented to achieve route optimization in a system implementing Mobile IP.

Figure 2:
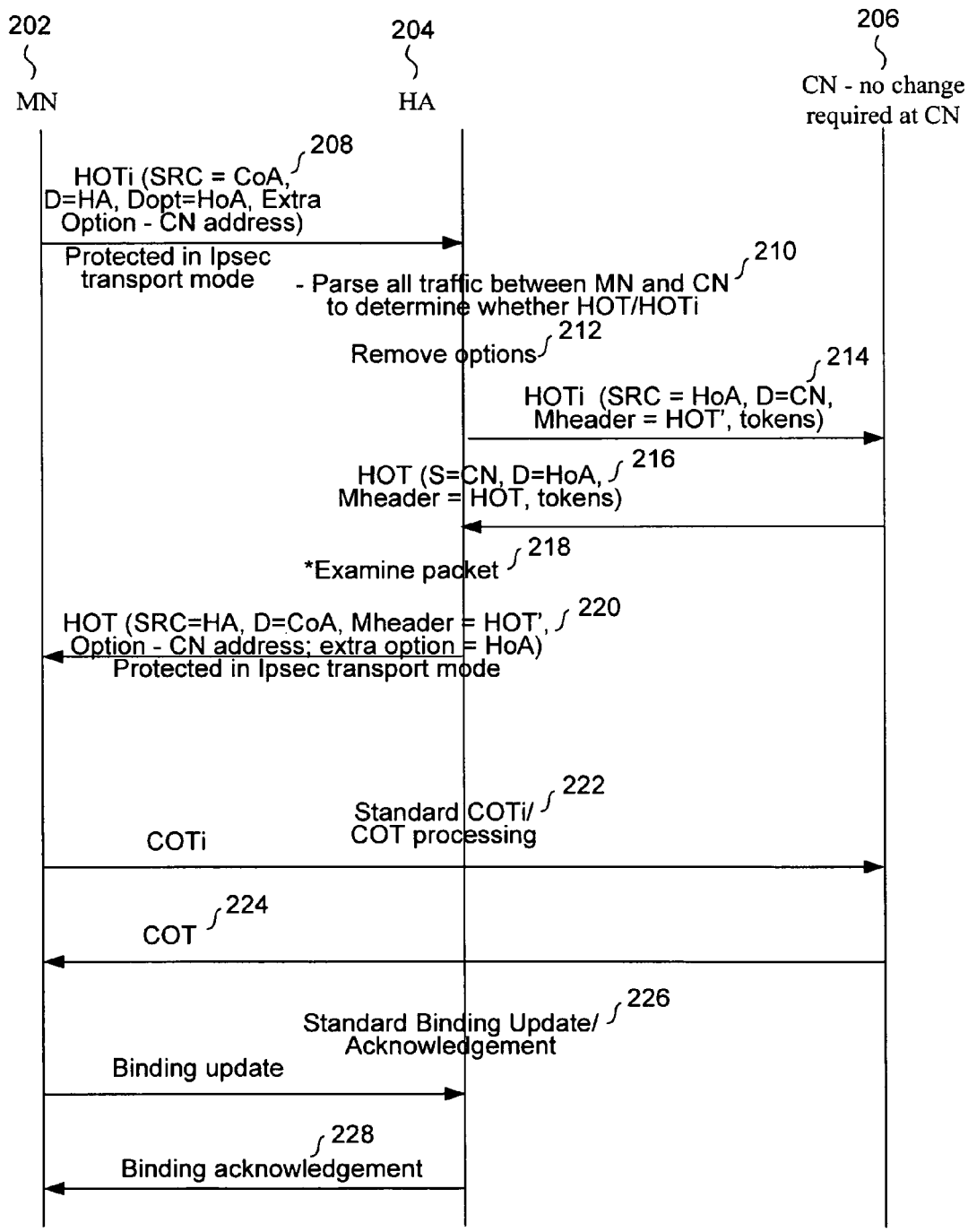
FIG. 2 is a transaction flow diagram illustrating a method of achieving route optimization in accordance with a first embodiment of the invention.

FIG. 2 is a transaction flow diagram illustrating a method of achieving route optimization in accordance with a first embodiment of the invention. This embodiment is advantageous since the format of the messages transmitted between the Mobile Node and Home Agent (e.g., HOTi and modified HOT messages) differs from the format of the messages transmitted between the Mobile Node and Correspondent Node (e.g., modified HOTi and HOT messages). More particularly, the modified HOTi message includes a header that has a format that is different from the format of the header of the HOTi message, and the HOT message includes a header that has a format that is different from the format of the header of the initial HOT message. As will be described in further detail, the format of the header of the two sets of HOTi/HOT messages is different, thereby eliminating the need for modification of the Correspondent Node.

Steps performed by the Mobile Node, Home Agent, and Correspondent Node are represented by vertical lines 202, 204, and 206, respectively. As shown at 208, the Mobile Node generates a HOTi message and transmits the HOTi message to the Home Agent in IPSec transport mode. The HOTi message includes a source address equal to a care-of address of the Mobile Node, a destination address equal to the address of the Home Agent, a destination option equal to the Mobile Node's home address, and an extra option including an address of the Correspondent Node. The Home Agent receives the HOTi message and parses all traffic at 210 between the Mobile Node and Correspondent Node in accordance with RFC 3775 to determine whether the traffic is HOT/HOTi traffic. The Home Agent removes the options (e.g., destination option and extra option) from the HOTi message at 212. Thus, in order to modify the HOTi message, the Home Agent replaces the source address with the Mobile Node's home address obtained from the destination option and replaces the destination address with the address of the Correspondent Node obtained from the extra option. The Home Agent then transmits the modified HOTi message at 214 to the Correspondent Node, which is formatted in accordance with RFC 3775. The modified HOTi message includes a source address equal to the Mobile Node's home address, a destination address equal to the address of the Correspondent Node, and the tokens generated in accordance with RFC 3775, which will be used to generate the shared key between the Mobile Node and the Correspondent Node. The modified HOTi message may also include an identifier indicating the type of header of the HOTi message. Since the HOTi message received by the Correspondent Node conforms to the format set forth in RFC 3775, the Correspondent Node need not be modified.

The Correspondent Node sends a HOT message at 216 including a source address of the Correspondent Node and a destination address equal to the home address of the Mobile Node. The HOT message also includes the tokens generated in accordance with RFC 3775. The HOT message may also include an identifier indicating the type of header of the HOT message.

The Home Agent examines the HOT message at 218 and generates a modified message, which it transmits to the Mobile Node at 220. The modified HOT message includes a source address equal to an address of the Home Agent, a destination address equal to a care-of address of the Mobile Node, a first option including an address of the Correspondent Node and a second option including a home address of the Mobile Node. The modified HOT message is protected in IPSec transport mode. A binding between the Mobile Node and the Correspondent Node may then be generated such that data packets transmitted between the Mobile Node and the Correspondent Node can be routed between the Mobile Node and the Correspondent Node without being routed via the Home Agent.

Standard processing is then performed in accordance with RFC 3775. Specifically, standard COTi processing and COT processing are performed at 222 and 224, respectively. The Mobile Node sends a Binding Update message at 226 to the Home Agent. The Home Agent then sends a Binding Acknowledgement to the Mobile Node at 228.

Figure 3:
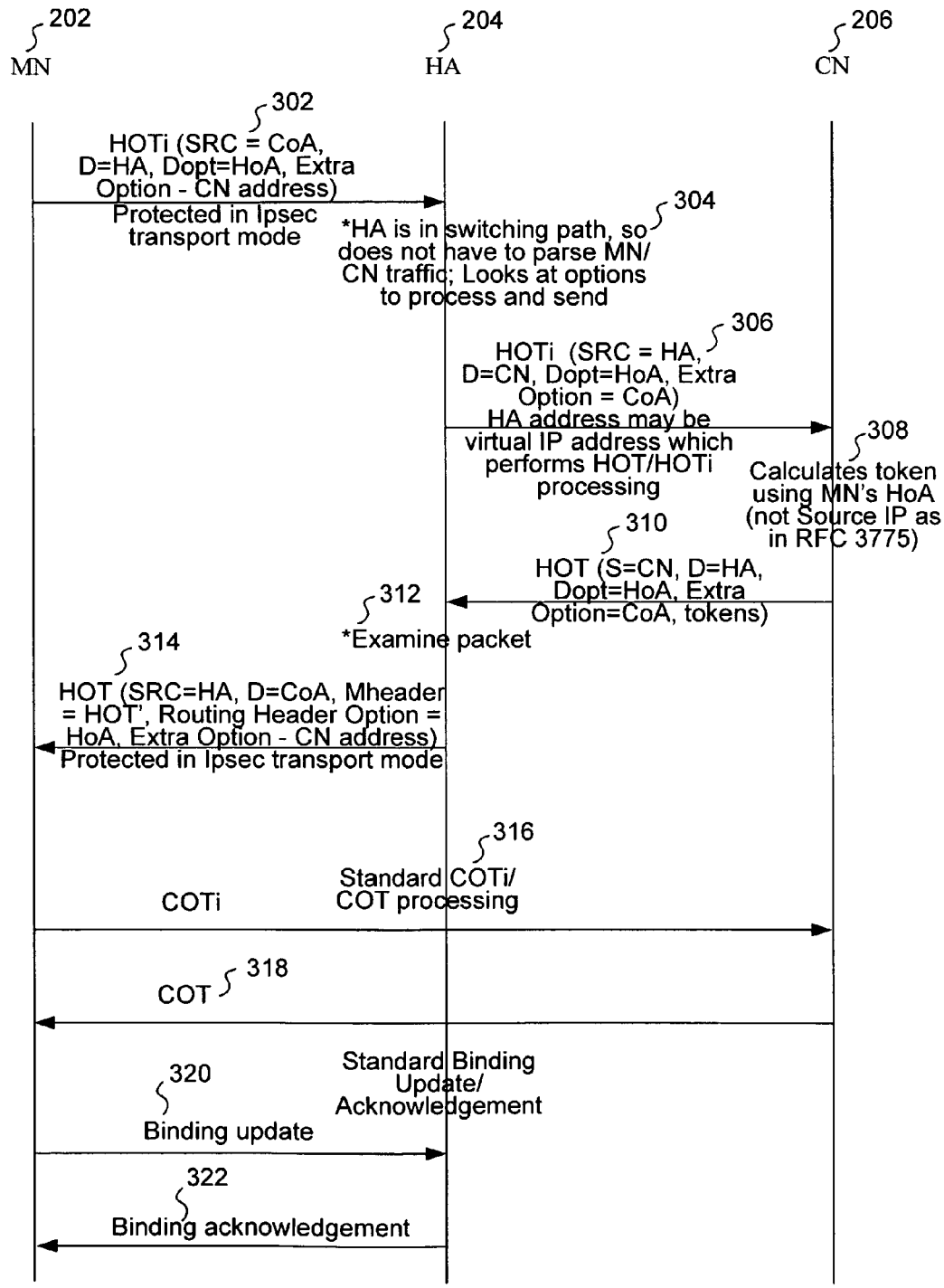
FIG. 3 is a transaction flow diagram illustrating a method of achieving route optimization in accordance with a second embodiment of the invention.

FIG. 3 is a transaction flow diagram illustrating a method of achieving route optimization in accordance with a second embodiment of the invention. In this embodiment, the Home Agent is in the switching path, and therefore it need not parse the traffic transmitted between the Mobile Node and Correspondent Node in order to determine whether it is HOTi/HOT traffic. As shown at 302, the Mobile Node sends a HOTi message to the Home Agent, where the HOTi message is protected in IPSec transport mode. The HOTi message includes a source address equal to a care-of address of the Mobile Node, a destination address equal to the Home Agent address, a destination option equal to the Mobile Node's home address, and an extra option including an address of the Correspondent Node.

Since the HOTi message is addressed to the Home Agent, it need not parse the message to determine whether it should process the message. The Home Agent modifies the HOTi message at 304 and sends the modified HOTi message to the Correspondent Node at 306. The modified HOTi message includes a source address equal to an address of the Home Agent, a destination address equal to an address of the Correspondent Node, a destination option equal to the Mobile Node's home address, and an extra option equal to the care-of address of the Mobile Node. The Home Agent address may be a virtual address. Moreover, this Home Agent address may be dedicated to performing HOT/HOTi processing. In this manner, the identity of the Home Agent cannot easily be ascertained by the Correspondent Node or another entity.

When the Correspondent Node receives the modified HOTi message, it generates the token for use in authenticating communications between the Correspondent Node and the Mobile Node using the Mobile Node's home address at 308, rather than the source address of the modified HOTi message received by the Correspondent Node as required by RFC 3775. The Correspondent Node then generates a HOT message and sends the HOT message at 310 to the Home Agent. The HOT message includes a source address equal to the address of the Correspondent Node, a destination address equal to the address of the Home Agent, a destination option equal to the Mobile Node's home address, and an extra option equal to the care-of address of the Mobile Node, as well as the tokens generated in accordance with RFC 3775.

The Home Agent examines the HOT message at 312, generates a modified HOT message, and transmits the modified HOT message at 314 to the Mobile Node. The modified HOT message is protected in IPSec transport mode. The modified HOT message includes a source address equal to the address of the Home Agent, a destination address equal to the Mobile Node's care-of address, a first option including an address of the Correspondent Node and a second option including a home address of the Mobile Node. A binding between the Mobile Node and the Correspondent Node may then be generated such that data packets transmitted between the Mobile Node and the Correspondent Node can be routed between the Mobile Node and the Correspondent Node without being routed via the Home Agent.

Standard processing is then performed in accordance with RFC 3775. Specifically, standard COTi processing and COT processing are performed at 316 and 318, respectively. The Mobile Node sends a Binding Update message at 320 to the Home Agent. The Home Agent then sends a Binding Acknowledgement to the Mobile Node at 322.

Figure 4:
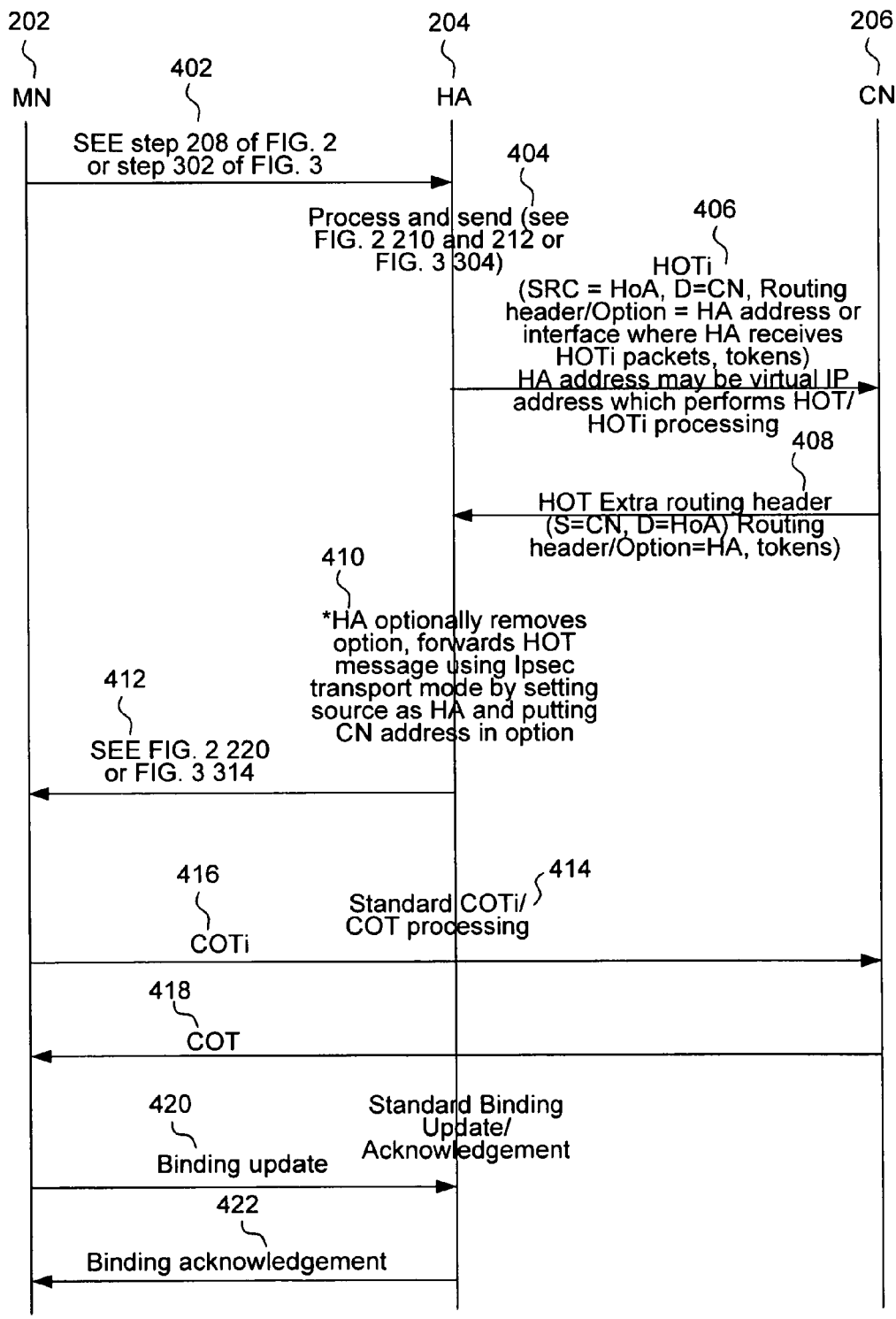
FIG. 4 is a transaction flow diagram illustrating a method of achieving route optimization in accordance with a third embodiment of the invention.

FIG. 4 is a transaction flow diagram illustrating a method of achieving route optimization in accordance with a third embodiment of the invention. In this embodiment, the routing header is used to intercept the HOT/HOTi packets at the Home Agent. As shown at 402, a HOTi message is transmitted by the Mobile Node. The HOTi message may conform to that described above with reference to step 208 of FIG. 2 or step 302 of FIG. 3. The Home Agent generates a modified HOTi message at 404, which may be performed in accordance with steps 210, 212 of FIG. 2 or step 304 of FIG. 3. As shown at 406, the modified HOTi message includes a source address equal to a home address of the Mobile Node, a destination address equal to an address of the Correspondent Node, a Routing Header, type 2 (RH2) option identifying an address of the Home Agent, and tokens generated in accordance with RFC 3775. The address of the Home Agent may be a virtual address associated with the Home Agent. This may be desirable, for example, in order to hide the identity of the Home Agent from the Correspondent Node (or other entities). Moreover, the virtual address may be dedicated to performing HOT/HOTi processing.

The Correspondent Node composes and sends a HOT message at 408, where the HOT message includes a source-address equal to the address of the Correspondent Node, a destination address equal to the home address of the Mobile Node, and a RH2 option including the address of the Home Agent. In addition, the HOT message also includes tokens generated in accordance with standard processes. The Home Agent may then remove the option from the HOT message and generates a modified HOT message. Specifically, the Home Agent provides the address of the Home Agent as a source address of the modified HOT message and the address of the Correspondent Node in an option of the modified HOT message at 410. The Home Agent then transmits the modified HOT message at 412 to the Mobile Node, as set forth above in step 220 of FIG. 2 or step 314 of FIG. 3, as appropriate. A binding between the Mobile Node and the Correspondent Node may then be generated such that data packets transmitted between the Mobile Node and the Correspondent Node can be routed between the Mobile Node and the Correspondent Node without being routed via the Home Agent.

Standard processing is then performed in accordance with RFC 3775. Specifically, standard COTi processing and COT processing are performed at 414 and 416, respectively. The Mobile Node sends a Binding Update message at 418 to the Home Agent. The Home Agent then sends a Binding Acknowledgement to the Mobile Node at 420.

As set forth above, the HOTi/HOT messages transmitted between the Mobile Node and Home Agent are protected in IPSec transport mode. In IPSec transport mode, the peers are the Mobile Node's home address and Home Agent address. Since the home address and Home Agent address are invariant addresses, a tunnel endpoint need not be updated when the Mobile Node moves. Similarly, the IPSec security association in transport mode does not change when the Mobile Node moves to a new location. Accordingly, route optimization is accomplished in an efficient manner.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (e.g. Mobile Node, Mobile Router, Home Agent, or Foreign Agent) of this invention may be specially constructed for the required purposes, or may be a general purpose programmable machine selectively activated or reconfigured by a computer program stored in memory. The processes presented herein are not inherently related to any particular router or other apparatus. In a preferred embodiment, any of the Home Agents of this invention may be specially configured routers such as specially configured router models 1700, 1800, 2500, 2600, 3200, 3600, 4000, 4500, 4700, 7200, and 7500 available from Cisco Systems, Inc. of San Jose, Calif. In addition, in a preferred embodiment, any of the Access Points of this invention may be specially configured routers such as specially configured router models 350, 1100, 1200 and 1400 available from Cisco Systems, Inc. of San Jose, Calif. Moreover, in a preferred embodiment, the Home Agent of this invention may be a specially configured router such as specially configured router model 3200 available from Cisco Systems, Inc. of San Jose, Calif. A general structure for some of these machines will appear from the description given below.

Generally, the route optimization technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid route optimization system of this invention is preferably implemented on a general-purpose programmable machine selectively activated or reconfigured by a computer program stored in memory. Such programmable machine may be a network device designed to handle network traffic. Such network devices typically have multiple network interfaces including frame relay, ISDN, and wireless interfaces, for example. Specific examples of such network devices include routers and switches. For example, the roaming systems of this invention may be specially configured routers such as specially configured router models 350, 1100, 1200, 1400, 1600, 2500, 2600, 3200, 3600, 4500, 4700, 7200, 7500, and 12000 available from Cisco Systems, Inc. of San Jose, Calif. A general architecture for some of these machines will appear from the description given below. In an alternative embodiment, the route optimization system may be implemented on a general-purpose network host machine such as a personal computer or workstation. Further, the invention may be at least partially implemented on a card (e.g., an interface card) for a network device or a general-purpose computing device.

Figure 5:
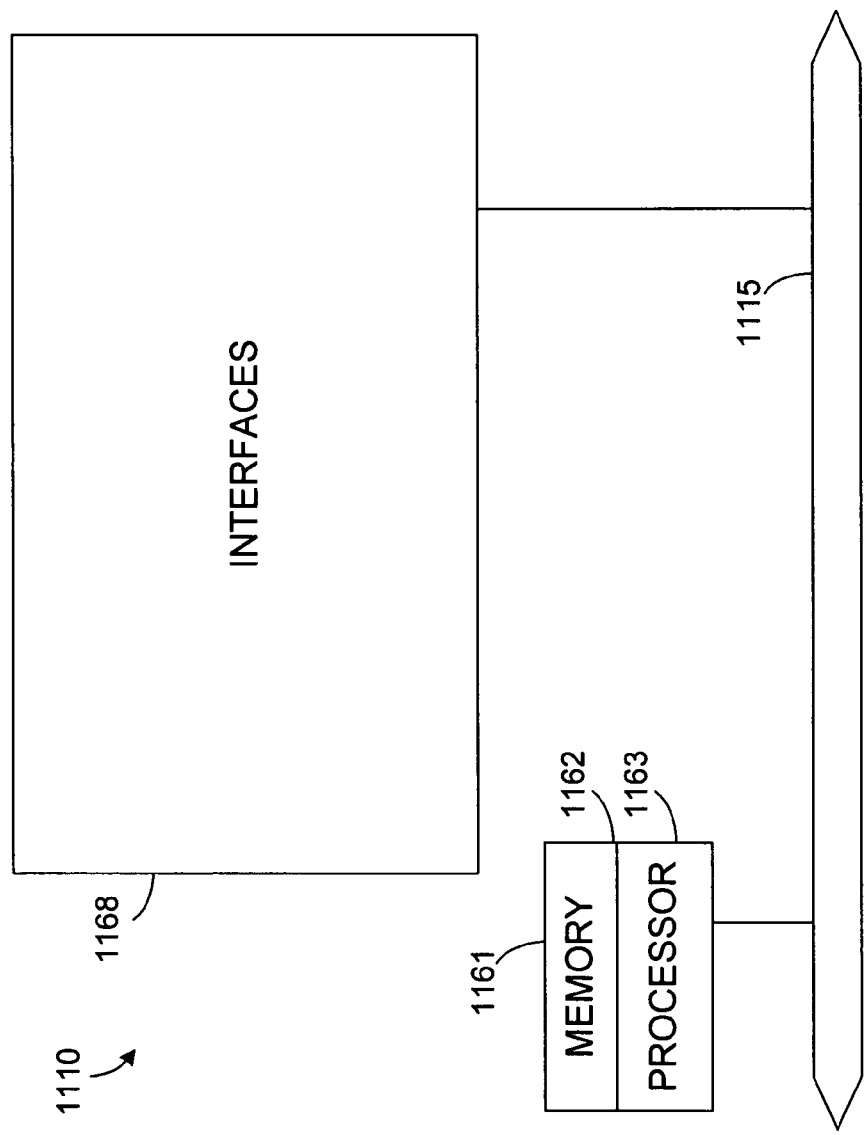
FIG. 5 is a diagrammatic representation of a router in which embodiments of the present invention may be implemented.

Referring now to FIG. 5, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 5 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 1161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For instance, the disclosed message formats are merely illustrative, and therefore other messages may be used to establish route optimization. Moreover, although the example described refers to IPv6, the present invention may be used with IP addresses that conform to other versions of IP. Therefore, the described embodiments should be taken as illustrative and not restrictive, and the invention should not be limited to the details given herein but should be defined by the following claims and their full scope of equivalents.

What is claimed is:

1. In a Home Agent supporting Mobile IP, a method of notifying a Correspondent Node of a Mobile Node's location, thereby enabling the Correspondent Node to communicate directly with the Mobile Node, comprising:
receiving a HOTi message protected in IPSec transport mode from the Mobile Node;
modifying the HOTi message and transmitting the modified HOTi message to the Correspondent Node;
receiving a HOT message from the Correspondent Node; and
modifying the HOT message and transmitting the modified HOT message to the Mobile Node, wherein the modified HOT message is protected in IPSec transport mode, wherein the HOTi message includes a source address equal to a care-of address of the Mobile Node, a destination option equal to the Mobile Node's home address, and an extra option including an address of the Correspondent Node, and the modified HOTi message includes a source address equal to the Mobile Node's home address and a destination address equal to the address of the Correspondent Node, wherein modifying the HOTi message comprises:
removing the destination option and the extra option
replacing the source address with the Mobile Node's home address obtained from the destination option; and
replacing the destination address with the address of the Correspondent Node obtained from the extra option.

2. The method as recited in claim 1, wherein the modified HOTi message is transmitted in IPSec transport mode.

3. The method as recited in claim 1, wherein the modified HOT message includes a destination address equal to a care-of address of the Mobile Node.

4. The method as recited in claim 3, wherein the modified HOT message includes a first option including an address of the Correspondent Node and a second option including a home address of the Mobile Node.

5. The method as recited in claim 1, wherein the destination address of the HOTi message is an address of the Home Agent, the destination address of the HOT message is the address of the Home Agent, and the source address of the modified HOT message is the address of the Home Agent.

6. The method as recited in claim 1, wherein the modified HOTi message and the HOT message include a RH2 option including an address of the Home Agent.

7. The method as recited in claim 6, wherein the address is a virtual address.

8. The method as recited in claim 7, wherein the virtual address is an address which is dedicated to performing HOT/HOTi processing.

9. In a Home Agent supporting Mobile IP, a method of notifying a Correspondent Node of a Mobile Node's location, thereby enabling the Correspondent Node to communicate directly with the Mobile Node, comprising:
receiving a HOTi message protected in IPSec transport mode from the Mobile Node;
modifying the HOTi message and transmitting the modified HOTi message to the Correspondent Node;
receiving a HOT message from the Correspondent Node; and
modifying the HOT message and transmitting the modified HOT message to the Mobile Node, wherein the modified HOT message is protected in IPSec transport mode, wherein the HOTi message includes a source address equal to a care-of address of the Mobile Node, a destination option equal to the Mobile Node'home address, and an extra option including an address of the Correspondent Node, and the modified HOTi message includes a source address equal to an address of the Home Agent, a destination address equal to an address of the Correspondent Node, a destination option equal to the Mobile Node'home address, and an extra option equal to the care-of address of the Mobile Node, wherein the HOT message includes a source address equal to the address of the Correspondent Node, a destination address equal to the address of the Home Agent, a destination option equal to the Mobile Node'home address, and an extra option equal to the care-of address of the Mobile Node.

10. The method as recited in claim 9, wherein the modified HOT message includes a source address equal to the address of the Home Agent, a destination address equal to the Mobile Node'care-of address, a first option including an address of the Correspondent Node and a second option including a home address of the Mobile Node.

11. In a Home Agent supporting Mobile IP, a method of notifying a Correspondent Node of a Mobile Node'location, thereby enabling the Correspondent Node to communicate directly with the Mobile Node, comprising:
receiving a HOTi message protected in IPSec transport mode from the Mobile Node;
modifying the HOTi message and transmitting the modified HOTi message to the Correspondent Node;
receiving a HOT message from the Correspondent Node; and
modifying the HOT message and transmitting the modified HOT message to the Mobile Node, wherein the modified HOT message is protected in IPSec transport mode;
wherein the modified HOTi message includes a source address equal to a home address of the Mobile Node, a destination address equal to an address of the Correspondent Node, and an option including an address of the Home Agent, and wherein the HOT message includes a source address equal to the address of the Correspondent Node, a destination address equal to the home address of the Mobile Node, and an option including the address of the Home Agent.

12. The method as recited in claim 11, wherein the address of the Home Agent is a virtual address.

13. The method as recited in claim 11, wherein the address of the Home Agent is an IP address which is dedicated to performing HOT/HOTi processing.

14. The method as recited in claim 11, wherein modifying the HOT message comprises:
removing the option from the HOT message.

15. The method as recited in claim 11, wherein modifying the HOT message comprises:
providing the address of the Home Agent as a source address of the modified HOT message; and
providing the address of the Correspondent Node in an option of the modified HOT message.

16. A Home Agent supporting Mobile IP and adapted for notifying a Correspondent Node of a Mobile Node'location, thereby enabling the Correspondent Node to communicate directly with the Mobile Node, comprising:
means for receiving a HOTi message protected in IPSec transport mode from the Mobile Node;

means for modifying the HOTi message and transmitting the modified HOTi message to the Correspondent Node;

means for receiving a HOT message from the Correspondent Node; and means for modifying the HOT message and transmitting the modified HOT message to the Mobile Node, wherein the modified HOT message is protected in IPSec transport mode, wherein the HOTi message includes a source address equal to a care-of address of the Mobile Node, a destination option equal to the Mobile Node'home address, and an extra option including an address of the Correspondent Node, and the modified HOTi message includes a source address equal to the Mobile Node'home address and a destination address equal to the address of the Correspondent Node, wherein the means for modifying the HOTi message includes:

means for removing the destination option and the extra option means for eplacing the source address with the Mobile Node'home address obtained from the destination option; and means for replacing the destination address with the address of the Correspondent Node obtained from the extra option.

17. A Home Agent supporting Mobile IP and adapted for notifying a Correspondent Node of a Mobile Node'location, thereby enabling the Correspondent Node to communicate directly with the Mobile Node, comprising:

a processor; and a memory, at least one of the processor and the memory being adapted for: receiving a HOTi message protected in IPSec transport mode from the Mobile Node;

modifying the HOTi message and transmitting the modified HOTi message to the Correspondent Node;

receiving a HOT message from the Correspondent Node; and modifying the HOT message and transmitting the modified HOT message to the Mobile Node, wherein the modified HOT message is protected in IPSec transport mode, wherein the HOTi message includes a source address equal to a care-of address of the Mobile Node, a destination option equal to the Mobile Node'home address, and an extra option including an address of the Correspondent Node, and the modified HOTi message includes a source address equal to the Mobile Node'home address and a destination address equal to the address of the Correspondent Node, wherein modifying the HOTi message comprises:

removing the destination option and the extra option replacing the source address with the Mobile Node'home address obtained from the destination option; and replacing the destination address with the address of the Correspondent Node obtained from the extra option.

18. A Home Agent supporting Mobile IP, the Home Agent adapted for notifying a Correspondent Node of a Mobile Node'location, thereby enabling the Correspondent Node to communicate directly with the Mobile Node, comprising:

a processor; and a memory, at least one of the processor or the memory being adapted for:

receiving a HOTi message protected in IPSec transport mode from the Mobile Node;

modifying the HOTi message and transmitting the modified HOTi message to the Correspondent Node;

receiving a HOT message from the Correspondent Node; and modifying the HOT message and transmitting the modified HOT message to the Mobile Node, wherein the modified HOT message is protected in IPSec transport mode, wherein the HOTi message includes a source address equal to a care-of address of the Mobile Node, a destination option equal to the Mobile Node'home address, and an extra option including an address of the Correspondent Node, and the modified HOTi message includes a source address equal to an address of the Home Agent, a destination address equal to an address of the Correspondent Node, a destination option equal to the Mobile Node'home address, and an extra option equal to the care-of address of the Mobile Node, wherein the HOT message includes a source address equal to the address of the Correspondent Node, a destination address equal to the address of the Home Agent, a destination option equal to the Mobile Node'home address, and an extra option equal to the care-of address of the Mobile Node.

19. A computer-readable medium storing thereon computer-readable instructions for enabling a Home Agent supporting Mobile IP to notify a Correspondent Node of a Mobile Node'location, thereby enabling the Correspondent Node to communicate directly with the Mobile Node, comprising:

instructions for receiving a HOTi message protected in IPSec transport mode from the Mobile Node;

instructions for modifying the HOTi message and transmitting the modified HOTi message to the Correspondent Node;

instructions for receiving a HOT message from the Correspondent Node; and instructions for modifying the HOT message and transmitting the modified HOT message to the Mobile Node, wherein the modified HOT message is protected in IPSec transport mode, wherein the HOTi message includes a source address equal to a care-of address of the Mobile Node, a destination option equal to the Mobile Node'home address, and an extra option including an address of the Correspondent Node, and the modified HOTi message includes a source address equal to an address of the Home Agent, a destination address equal to an address of the Correspondent Node, a destination option equal to the Mobile Node'home address, and an extra option equal to the care-of address of the Mobile Node, wherein the HOT message includes a source address equal to the address of the Correspondent Node, a destination address equal to the address of the Home Agent, a destination option equal to the Mobile Node'home address, and an extra option equal to the care-of address of the Mobile Node.

* * * * *